United States Patent
Miyazaki et al.

(10) Patent No.: US 8,649,892 B2
(45) Date of Patent: Feb. 11, 2014

(54) PRODUCTION MANAGEMENT SYSTEM

(75) Inventors: Katsuhisa Miyazaki, Tokyo (JP); Shinji Kobayashi, Tokyo (JP); Yoshio Matsuoka, Tokyo (JP); Yoshio Hata, Tokyo (JP); Jun Hikoe, Tokyo (JP)

(73) Assignee: Honda Motor Co., Ltd., Tokyo (JP)

(*) Notice: Subject to any disclaimer, the term of this patent is extended or adjusted under 35 U.S.C. 154(b) by 649 days.

(21) Appl. No.: 11/910,762

(22) PCT Filed: Apr. 3, 2006

(86) PCT No.: PCT/JP2006/307042
§ 371 (c)(1),
(2), (4) Date: Oct. 5, 2007

(87) PCT Pub. No.: WO2006/109603
PCT Pub. Date: Oct. 19, 2006

(65) Prior Publication Data
US 2009/0177307 A1  Jul. 9, 2009

(30) Foreign Application Priority Data
Apr. 6, 2005  (JP) .................. 2005-109292

(51) Int. Cl.
*G06F 19/00* (2011.01)
(52) U.S. Cl.
USPC .............................. 700/95; 700/110; 901/50
(58) Field of Classification Search
USPC ........................ 700/95, 110; 901/50
See application file for complete search history.

(56) References Cited

U.S. PATENT DOCUMENTS

| | | | | |
|---|---|---|---|---|
| 4,080,896 A * | 3/1978 | McKay et al. | ........... | 101/486 |
| 4,159,392 A * | 6/1979 | Fineo et al. | ........... | 373/38 |
| 4,615,274 A * | 10/1986 | Hoehn | ........... | 104/167 |
| 4,812,104 A * | 3/1989 | Suzuki | ........... | 414/735 |
| 5,237,468 A * | 8/1993 | Ellis | ........... | 360/92.1 |
| 5,784,542 A * | 7/1998 | Ohm et al. | ........... | 700/260 |
| 6,415,191 B1 * | 7/2002 | Pryor | ........... | 700/95 |
| 6,781,338 B2 * | 8/2004 | Jones et al. | ........... | 318/567 |
| 2003/0114958 A1 * | 6/2003 | Plutt et al. | ........... | 700/245 |
| 2004/0083010 A1 * | 4/2004 | Nagata et al. | ........... | 700/1 |
| 2005/0087423 A1 * | 4/2005 | Rasmussen | ........... | 194/217 |
| 2005/0223532 A1 * | 10/2005 | Ghuman et al. | ........... | 29/407.09 |
| 2006/0015211 A1 * | 1/2006 | Kolb et al. | ........... | 700/213 |

FOREIGN PATENT DOCUMENTS

| | | | | |
|---|---|---|---|---|
| JP | 62213948 A * | 9/1987 | ........... | B23Q 41/04 |
| JP | 63-106591 | 5/1988 | | |
| JP | 63-106591 | 7/1988 | | |

(Continued)

*Primary Examiner* — Kavita Padmanabhan
*Assistant Examiner* — Jason Lin
(74) *Attorney, Agent, or Firm* — Rankin, Hill & Clark LLP

(57) ABSTRACT

There is provided a production management system that requires no backup step for performing a backup operation when trouble occurs in a robot, and can increase workability of a repair operation of the robot. The production management system for a production line mixedly including robot operation steps and manual operation steps, including: a monitor that displays the cause of abnormality that occurs in the robot operation step; a warning device that warns of occurrence of abnormality in the robot operation step; and a robot reversing device that reverses the orientation of a robot when abnormality occurs in the robot, wherein production is continued by changing the robot operation step where the abnormality occurs to the manual operation step. Also, a repair operation is performed for the robot reversed by the robot reversing device.

4 Claims, 3 Drawing Sheets

(56) References Cited

FOREIGN PATENT DOCUMENTS

| JP | 63-284075 | | 11/1988 | |
| JP | 05-105138 | | 4/1993 | |
| JP | 1993265535 | * | 10/1993 | ........... G05B 19/417 |
| JP | 06-190662 | | 7/1994 | |
| JP | 06-337881 | | 12/1994 | |
| JP | 10-244431 | | 9/1998 | |
| JP | 2002-082706 | | 3/2002 | |
| JP | 2006-018575 | | 1/2006 | |

* cited by examiner

PRODUCTION MANAGEMENT SYSTEM

TECHNICAL FIELD

The present invention relates to a production management system for a production line mixedly including robot operation steps and manual operation steps.

BACKGROUND ART

Conventionally, in a production line mixedly including robot operation steps and manual operation steps such as an automobile body assembly line, in the case where trouble such as malfunction occurs in a robot during an assembly operation in the robot operation step, the malfunction of the robot is detected by a detection device, a transfer device in the production line is urgently stopped while a warning based on the detection is issued, the assembly operation by the robot is stopped, and the robot is returned to its original position.

Then, after a maintenance operator confirms that there is no problem in safety and production in the robot operation step, a backup operator is located in a backup step downstream of the robot operation step where the trouble occurs. Then, the transfer device is operated again, the backup operator performs an uncompleted operation of the robot in the backup step, and the maintenance operator performs a repair operation of the robot in the robot operation step (for example, see Patent Documents 1 to 3).

Patent Document 1: Japanese Patent Application Publication No. 63-284075
Patent Document 2: Japanese Patent Application Publication No. 5-105138
Patent Document 3: Japanese Patent Application Publication No. 6-190662

DISCLOSURE OF THE INVENTION

In the methods disclosed in Patent Documents 1 to 3, however, the backup step that is not usually used needs to be provided downstream of the robot operation step, which disadvantageously increases the production line. Also, components assembled by the robot need to be prepared in the backup step, which is troublesome.

Further, the maintenance operator performs the repair operation of the robot in a small space between the transfer device and the robot in the robot operation step, which reduces workability and requires a long time for repair.

The present invention is achieved in view of such problems of the conventional technique, and has an object to provide a production management system that requires no backup step for performing a backup operation when trouble occurs in a robot, and can increase workability of a repair operation of the robot.

In order to achieve the above described problem, the invention according to claim 1 provides a production management system for a production line mixedly including robot operation steps and manual operation steps, including: a monitor that displays the cause of abnormality that occurs in the robot operation step; a warning device that warns of occurrence of abnormality in the robot operation step; and a robot reversing device that reverses the orientation of a robot when abnormality occurs in the robot, wherein production is continued by changing the robot operation step where the abnormality occurs to the manual operation step.

The invention according to claim 2, wherein a repair operation is performed for the robot reversed by the robot reversing device in the production management system in claim 1.

As described above, according to the invention in claim 1, the system is used by changing the robot operation step where the abnormality occurs to the manual operation step, and thus requires no backup step for performing a backup operation when trouble occurs in the robot, thereby reducing the production line and reducing space for the production line.

According to the invention in claim 2, the repair operation of the robot in which abnormality occurs can be performed in a reversed state, thereby increasing workability for a maintenance operator.

BEST MODE FOR CARRYING OUT THE INVENTION

Figure 1:
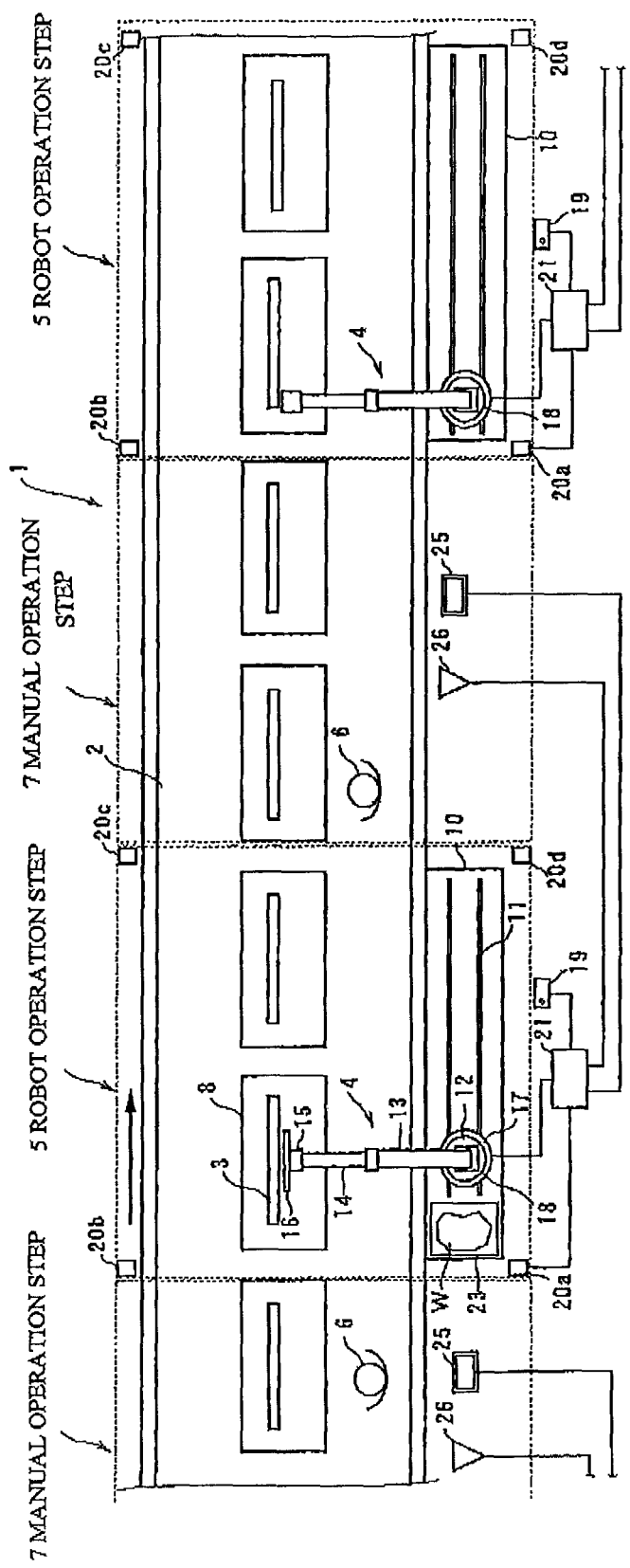
FIG. 1 is a schematic plan view of a door assembly line to which a production management system according to the present invention is applied.
Figure 2:
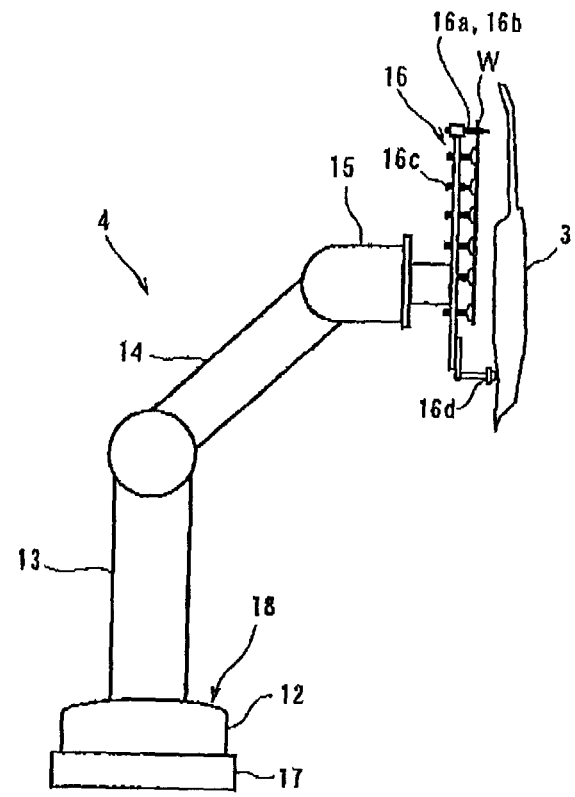
FIG. 2 illustrates an operation of a robot.
Figure 3:
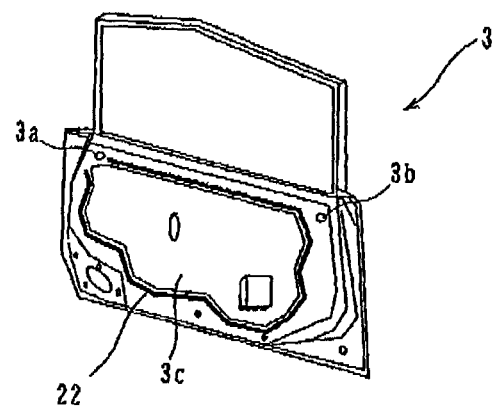
FIG. 3 is a perspective view of a door.
Figure 4:
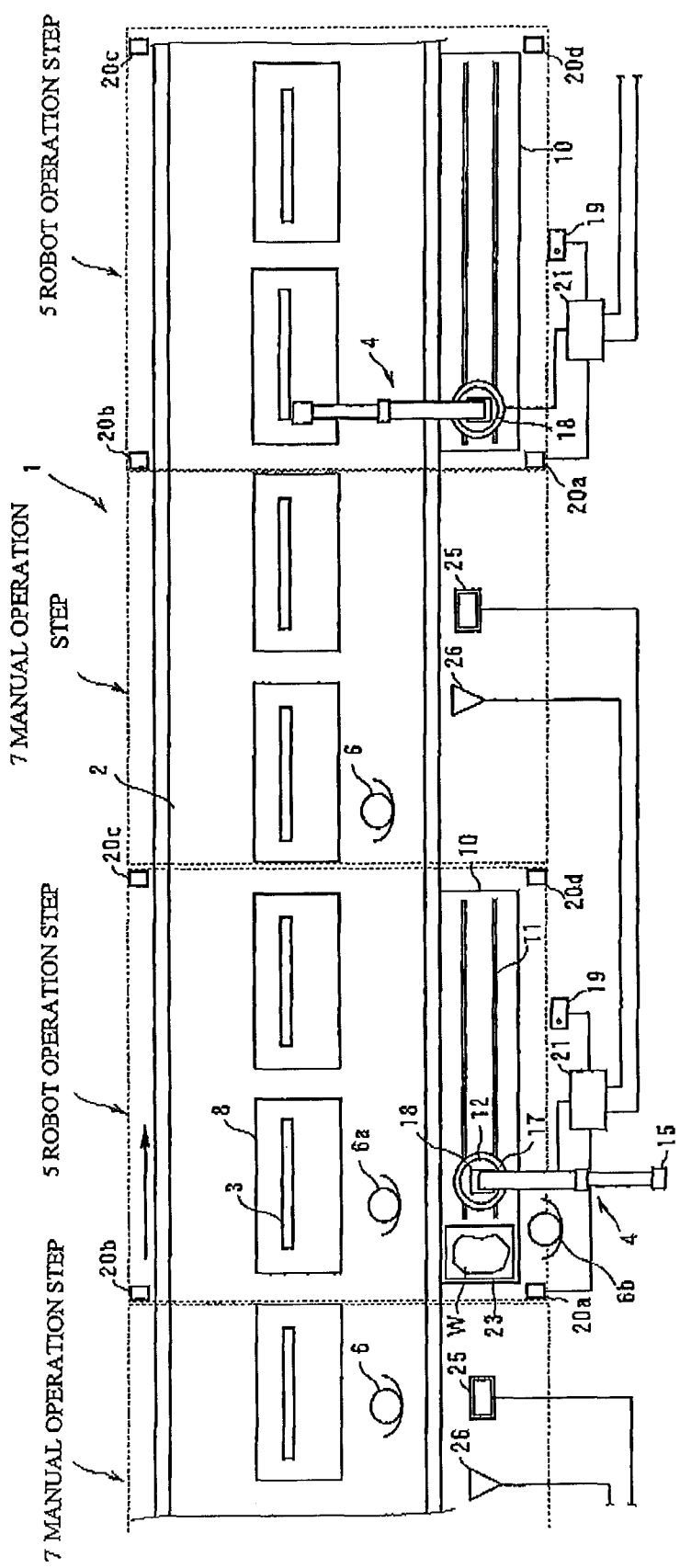
FIG. 4 is a schematic plan view of the door assembly line with the robot in a reversed state.

Now, an embodiment of the present invention will be described with reference to the accompanying drawings. FIG. 1 is a schematic plan view of a door assembly line to which a production management system according to the present invention is applied, FIG. 2 illustrates an operation of a robot, FIG. 3 is a perspective view of a door, and FIG. 4 is a schematic plan view of the door assembly line with the robot in a reversed state.

A production line to which the production management system according to the present invention is applied is a door assembly line 1 in a vehicle body assembly plant as shown in FIG. 1.

The door assembly line 1 is a production line for assembling various components to doors 3 that are workpieces transferred by a transfer conveyor 2, and mixedly includes robot operation steps 5 by a robot 4 and manual operation steps 7 by an operator 6. The doors 3 are supported by door support jigs 8 standing at regular intervals on the transfer conveyor 2, and transferred from upstream to downstream.

In each robot operation step 5, a base 10 is placed on one side of the transfer conveyor 2, and a transfer rail 11 is laid on the base 10 in parallel with the transfer conveyor 2 so that the robot 4 can be moved in synchronization with the transfer conveyor 2. As shown in FIG. 2, the robot 4 is a six-axis articulated arm robot, and includes a first platform 12 as a base, a first arm 13 standing on the first platform 12, a second arm 14 connected to the first arm 13, and a wrist 15 provided at a tip of the second arm 14. To a tip of the wrist 15, a door hole seal support 16 that holds a door hole seal W is mounted.

The robot 4 is provided on a second platform 17 that movably engages the transfer rail 11, and is rotatable around a vertical axis on the second platform 17 by the first platform 12 including a robot reversing device 18. The second platform 17 includes synchronous moving means for moving the robot 4 in synchronization with the transfer conveyor 2.

The robot reversing device 18 is activated by the operator 6 operating a manual operation box 19 of the robot 4 in a state where the robot 4 returns to its original position, and can reverse the robot 4 (rotate the robot 4 180 degrees) as shown in FIG. 4.

Reference numerals 20a, 20b, 20c and 20d denote safety sensors. The safety sensors 20a, 20b, 20c and 20d are placed at four corners of an area of the robot operation step 5, and is activated when the operator 6 or the like enters the area of the robot operation step 5 to bring the robot 4 into an emergency stop. Reference numeral 21 denotes a control board, which houses a control device of the robot 4, a line control device for controlling the line such as an interlock between the robot 4 and the transfer conveyor 2, or the like. The manual operation box 19 and the safety sensors 20a, 20b, 20c and 20d are electrically connected to the control board 21 respectively.

As shown in FIGS. 2 and 3, the door hole seal support 16 has, on both sides at an upper end thereof, positioning pins 16a and 16b corresponding to positioning holes 3a and 3b in an inner surface of the door 3, and a vacuum coupler 16c that sucks a peripheral edge of the door hole seal W is provided below the positioning pins 16a and 16b. Further, at a lower end of the door hole seal support 16, a press roller 16d is provided that presses the door hole seal W along an application line of a sealer 22 applied to the door 3 after attachment of the door hole seal W to the inside of the door 3.

In such a robot operation step 5, the robot 4 performs an operation of sucking the door hole seal W positioned and laid on a pallet 23 placed upstream of the base 10, pressing the door hole seal W against the sealer 22 applied to a peripheral edge of a door hole opening 3c in the inner surface of the door 3 in a previous step, and attaching the door hole seal W to the inner surface of the door 3. In other robot operation steps 5, catching and fastening operations of bolts and nuts are performed.

In the manual operation step 7, the operator 6 assembles the components to the doors 3 supported by the door support jigs 8 standing at regular intervals on the transfer conveyor 2 while being located on the transfer conveyor 2. Near the manual operation step 7, a monitor 25 that displays the cause of abnormality that occurs in the robot operation step 5, and a warning device 26 that warns of the occurrence of abnormality in the robot operation step 5 are placed. The monitor 25 and the warning device 26 are electrically connected to the control board 21 respectively.

An operation of the production management system according to the present invention thus configured will be descried. When the robot 4 performs the operation in the robot operation step 5, the robot 4 positioned upstream of the transfer rail 11 first sucks the door hole seal W positioned and laid on the pallet 23 with the vacuum coupler 16c of the door hole seal support 16.

Then, the robot 4 is moved on the transfer rail 11 in synchronization with the transfer conveyor 2, and in the meantime, the positioning pins 16a and 16b of the door hole seal support 16 are inserted into the positioning holes 3a and 3b in the inner surface of the door 3 supported by the door support jig 8 to position and attach the sucked door hole seal W onto the inner surface of the door 3 via the sealer 22 and simultaneously stop the suction by the vacuum coupler 16c.

Then, the press roller 16d of the door hole seal support 16 presses the door hole seal W along the application line of the sealer 22 applied to the door 3 to reliably attach the door hole seal W to the door hole opening 3c in the inner surface of the door 3.

When trouble occurs in a drive system or a sensor system of the robot 4 in the robot operation step 5 for performing the above described operation, or simple trouble (trouble from which the operator can easily recover) occurs such as poor suction of the door hole seal W or poor catching and fastening of bolts and nuts, the robot 4 stops the operation, and the transfer conveyor 2 interlocked with the robot 4 is also stopped.

The monitor 25 placed in the adjacent manual operation step 7 displays the cause of the stop of the robot 4 in the robot operation step 5 where the trouble occurs, and the warning device 26 placed in the adjacent manual operation step 7 further warns of the occurrence of abnormality in the robot operation step 5. Then, the operator 6 in the manual operation step 7 adjacent to the robot operation step 5 where the trouble occurs confirms the cause of the stop of the robot 4 on the monitor 25.

For example, a countermeasure for the case where simple trouble such as poor suction of the door hole seal W occurs will be described.

First, the operator 6 turns off switches of the safety sensors 20a, 20b, 20c and 20d in the robot operation step 5 where the trouble occurs so as to prevent activation of the safety sensors 20a, 20b, 20c and 20d. Then, the operator 6 enters the robot operation step 5, operates the manual operation box 19 to remove the components such as the door hole seal W from the door hole seal support 16 mounted to the robot 4, and returns the robot 4 to its original position.

Then, the operator 6 leaves the robot operation step 5, and turns on the switches of the safety sensors 20a, 20b, 20c and 20d to again operate the robot 4. When the same trouble again occurs, however, the operator 6 performs the same operation as described above such as the removal of the components, returns the robot 4 to its original position, and then operates the robot reversing device 18 provided on the first platform 12 with the manual operation box 19 to rotate the robot 4 180 degrees and reverse the robot 4.

Then, as shown in FIG. 4, a backup operator 6a is located in the robot operation step 5 where the trouble occurs, and releases the interlock between the robot 4 and the transfer conveyor 2 to again operate the transfer conveyor 2. The backup operator 6a performs the same operation as the robot 4 in the robot operation step 5. Specifically, production is continued by the backup operator 6a operating at the robot operation step 5 where the trouble occurs.

For the robot 4 with a failure in the mounted door hole seal support 16 or the like, the failure in the door hole seal support 16 or the like is repaired by a maintenance operator 6b in the reversed state in the robot operation step 5. When the repair of the door hole seal support 16 or the like is completed, the transfer conveyor 2 is stopped, and the backup operator 6a leaves the robot operation step 5.

Further, the robot reversing device 18 having, on the first platform 12, the robot 4 in which the repair of the door hole seal support 16 or the like is completed is operated by the manual operation box 19 to rotate the robot 4 180 degrees and return the robot 4 to its original position. Then, the switches of the safety sensors 20a, 20b, 20c and 20d are turned on, and the interlock between the robot 4 and the transfer conveyor 2 is activated to again operate the robot 4.

Next, a countermeasure for the case where trouble due to a robot itself such as in the drive system or the sensor system of the robot 4 occurs will be described.

First, the operator 6 in the adjacent manual operation step 7 confirms the cause of the stop of the robot 4 on the monitor 25, and turns off the switches of the safety sensors 20a, 20b, 20c and 20d in the robot operation step 5 where the trouble occurs so as to prevent activation of the safety sensors 20a, 20b, 20c and 20d.

Then, the operator 6 enters the robot operation step 5, operates the manual operation box 19 to remove the components such as the door hole seal W from the door hole seal support 16 mounted to the robot 4, and returns the robot 4 to its original position. Then, the robot reversing device 18 provided on the first platform 12 is operated by the manual operation box 19 to rotate the robot 4 180 degrees and reverse the robot 4.

Then, the backup operator 6a is located in the robot operation step 5 where the trouble occurs, and releases the interlock between the robot 4 and the transfer conveyor 2 to again operate the transfer conveyor 2. The backup operator 6a then performs the same operation as the robot 4 in the robot operation step 5. Specifically, production is continued by the backup operator 6a operating at the robot operation step 5 where the trouble occurs.

The robot 4 with a failure is repaired by the maintenance operator 6b in the reversed state in the robot operation step 5. When the repair of the robot 4 is completed, the transfer conveyor 2 is stopped, and the backup operator 6a leaves the robot operation step 5. Further, the robot reversing device 18 having, on the first platform 12, the robot 4 in which the repair is completed is operated by the manual operation box 19 to rotate the robot 4 180 degrees and return the robot 4 to its original position. Then, the switches of the safety sensors 20a, 20b, 20c and 20d are turned on, and the interlock between the robot 4 and the transfer conveyor 2 is activated to again operate the robot 4.

Thus, the orientation of the robot 4 in which the trouble occurs is reversed to ensure an operation space for the maintenance operator 6b to increase workability of the repair operation of the robot, and also ensure an operation space for the operator in the robot operation step 5 to increase workability of the assembly operation.

The robot operation step 5 where the trouble occurs is changed to the manual operation step 7 only during the repair of the robot 4, and thus the production can be continued in the robot operation step 5 without a backup step provided only for the case where trouble occurs in the robot operation step 5, thereby increasing productivity without increasing the production line.

INDUSTRIAL APPLICABILITY

According to the present invention, production can be continued by changing a robot operation step where trouble occurs to a manual operation step. Thus, a production management system is provided that requires no backup step, reduces space for a production line, and is effective for a production line mixedly including robot operation steps and manual operation steps.

The invention claimed is:

1. A production management system for a production line mixedly including at least one robot operation step in which at least one robot operation is performed and at least one manual operation step in which at least one manual operation is performed, the robot and manual operation steps being along a transfer conveyor, the production management system comprising:

a transfer rail disposed alongside and parallel to the transfer conveyor at the robot operation step;

a robot rotatably received on a platform that is slidably disposed on the transfer rail;

a monitor that displays a cause of abnormality that occurs at the robot operation step;

a warning device that warns of an occurrence of the abnormality at the robot operation step; and a robot reversing device that rotates the robot 180° about an axis that vertically extends from the platform, the robot being rotated the 180° so that the robot faces away from the transfer conveyor after the robot is returned to an original position along the transfer rail when the abnormality occurs at the robot operation step, wherein production is continued where the robot was located when the abnormality occurred by using a back up operator to replace the robot operation with a corresponding manual operation, and wherein said manual operation step being utilized even when the abnormality does not occur, and a repair operation is simultaneously performed for the robot that has been rotated the 180° about the vertical axis so as to be facing away from the transfer conveyor by said robot reversing device.

2. The production management system of claim 1, wherein the transfer conveyor is spaced from the transfer rail so as to provide space for the manual operation step.

3. The production management system of claim 1, wherein said production line is a assembly line for a door, and the door is assembled during at least one of the robot operation step and the manual operation step.

4. The production management system of claim 1, wherein the transfer conveyor is spaced from the transfer rail so as to provide space for the manual operation step, and wherein said production line is a assembly line for a door, and the door is assembled during at least one of the robot operation step and the manual operation step.

* * * * *